(12) United States Patent
Wong et al.

(10) Patent No.: US 7,820,093 B2
(45) Date of Patent: Oct. 26, 2010

(54) METHOD FOR PROCESSING STAMP MATERIAL

(76) Inventors: Kin Sun Wong, Room 1412. Block 3. Nan Fung Industrial City 18 Tin Hau Road, Tuen Mun (HK); Kam Hung Wan, Room 1412, Block 3, Nan Fung Industrial City 18 Tin Hau Road, Tuen Mun (HK); Hin Wah Wallace Tsang, Room 1412, Block 3, Nan Fung Industrial City 18 Tin Hau Road, Tuen Mun (HK); Kam Kwong Raymond Wan, Room 1412, Block 3, Nan Fung Industrial City 18 Tin Hau Road, Tuen Mun (HK)

( * ) Notice: Subject to any disclaimer, the term of this patent is extended or adjusted under 35 U.S.C. 154(b) by 164 days.

(21) Appl. No.: 11/972,603

(22) Filed: Jan. 10, 2008

(65) Prior Publication Data
US 2009/0179348 A1 Jul. 16, 2009

(51) Int. Cl.
*B29C 59/02* (2006.01)
*B29C 59/04* (2006.01)

(52) U.S. Cl. .......................... 264/293; 264/48; 264/321

(58) Field of Classification Search ................. 425/374, 425/385; 264/293, 322, 48, 321
See application file for complete search history.

(56) References Cited

U.S. PATENT DOCUMENTS

| 3,342,911 | A | * | 9/1967 | Funahashi | 264/46.5 |
|---|---|---|---|---|---|
| 3,816,233 | A | * | 6/1974 | Powers | 428/213 |
| 4,000,243 | A | * | 12/1976 | Curren | 264/293 |
| 4,201,818 | A | * | 5/1980 | Rohn | 428/159 |
| 5,878,668 | A | * | 3/1999 | Ando et al. | 101/379 |
| 6,042,772 | A | * | 3/2000 | Miyata et al. | 264/293 |
| 6,572,723 | B1 | * | 6/2003 | Tilton et al. | 156/219 |
| 7,097,805 | B2 | * | 8/2006 | Shih | 264/413 |
| 2006/0275583 | A1 | * | 12/2006 | Kitamura et al. | 428/156 |
| 2007/0284786 | A1 | * | 12/2007 | Chang | 264/444 |

* cited by examiner

*Primary Examiner*—Joseph S Del Sole
*Assistant Examiner*—Robert Dye

(57) ABSTRACT

A method for processing a stamp material generally includes: heating one of a pressing member and a surface layer of the stamp material; pressing the surface layer of the stamp material using the pressing member; and cooling the stamp material to normal temperature.

9 Claims, 2 Drawing Sheets

METHOD FOR PROCESSING STAMP MATERIAL

BACKGROUND OF THE INVENTION

The present invention relates to a method for processing a stamp material, and more particularly, to a hot-pressing method for processing a stamp material.

In conventional processes for processing a photosensitive stamp material, an article is formed out of a mixture including evenly mixed resin, photosensitive additive and filler by coaction of heat and pressure. The formed article is then disposed in a solvent to dissolve the filler out of the formed article, such that a sheet of porous stamp material is formed. After ink is injected into the stamp material on which a print surface has been formed, the ink may automatically seep toward the imprinting surface via micropores in the stamp material. In use, a seal can be formed on paper by simply pressing the stamp onto the paper. As to this type of stamp material, it is well known that high density stamp material can achieve a high clearness of seals, but can cause a low ink injection (i.e., seepage) speed and hence a prolonged length of time for the ink to be seeped to the print surface, i.e., a low ink injection efficiency; on the other hand, low density stamp material can achieve a high ink seepage speed and hence a high ink injection efficiency, but can cause a low clearness of the seals. In order to improve the clearness of the seal and the ink injection speed, a stamp combining stamp materials of different density has been proposed. In the proposed stamp, a layer of high density stamp material is disposed on one side of a low density stamp material and serves as a print surface of the stamp to achieve increased clearness of the seal. However, although the proposed stamp can improve the clearness of seal, the production of the stamp is complex and results in a high cost and therefore needs to be further improved. Moreover, in use of the conventional stamps, if too much ink is seeped over the print surface, the ink may soak into the paper at edges of seal characters, causing the seal to be blurred. What is needed, therefore, is an improved method for processing a stamp material which can overcome at least some of the drawbacks in the conventional technology.

BRIEF SUMMARY OF THE INVENTION

Embodiments of the present invention provides a hot-pressing method for processing a stamp material which can achieve a high clearness of the seal.

The method for processing the stamp material may generally include: heating one of a pressing member and a surface layer of the stamp material; pressing the surface layer of the stamp material using the pressing member; and cooling the stamp material to normal temperature.

In one embodiment, the pressing member or the surface layer of the stamp material may be heated to a temperature of 70° C. to 100° C. The pressing member may be heated to a temperature of about 100° C. to ensure that the surface layer of the stamp material can reach a temperature of 80° C. to 90° C. by heat conduction and radiation. Alternatively, the surface layer of the stamp material may be heated to a temperature of 80° C. to 90° C. The selected stamp material may be a dry and porous stamp material with a relatively low density. The pressing member may be a metal plate, a roller, or a metal screen. Alternatively, the pressing member may be a metal plate or roller having an accidented surface as fine as the metal screen.

One of a wide variety of processes can be used in carrying out the method described above. These processes may include, but not limited to, a pressing process, a pressing process in conjunction with a screen, a rolling process, a rolling process in conjunction with a screen, a high temperature vapour heating process and an infrared heating process.

In the pressing process, a stamp material is first placed on a planar table. A planar metal plate having a temperature of 80° C. to 90° C. is used to press a surface layer of the stamp material. The compression of the stamp material being compressed by the metal plate may be about 0.05 to 0.5 cm, and the pressing time may be controlled to be within 1 to 5 seconds. Then, the planar plate is removed, and the stamp material is cooled to achieve the processed stamp material.

In the pressing process in conjunction with a screen, a stamp material is first placed on a planar table. A 200 to 600-mesh screen is placed over the stamp material. A planar metal plate having a temperature of 80° C. to 90° C. is used to press the screen and a surface layer of the stamp material. The compression of the stamp material being compressed by the metal plate may be about 0.05 to 0.5 cm, and the pressing time may be controlled to be within 1 to 5 seconds. Then, the planar plate and the screen are removed, and the stamp material is cooled to achieve the processed stamp material.

In the rolling process, a stamp material is placed on a planar table. A roller having a temperature of 80° C. to 90° C. is used to roll a surface layer of the stamp material. The compression of the stamp material being compressed by the roller may be about 0.05 to 0.5 cm, and the rolling speed may be controlled to be 5 cm/second. Then, the stamp material is cooled to achieve the processed stamp material.

In the rolling process in conjunction with a screen, the stamp material is placed on a planar table. A 200 to 600-mesh screen is placed over the stamp material. A roller having a temperature of 80° C. to 90° C. is used to roll a surface layer of the stamp material. The compression of the stamp material being compressed by the roller may be about 0.05 to 0.5 cm, and the rolling speed may be controlled to be 5 cm/second. Then, the stamp material is cooled to achieve the processed stamp material.

In the high temperature vapour heating process, a stamp material is placed on a planar table. A surface layer of the stamp material is heated by spraying a high temperature vapour onto the surface layer. The vapour spray amount and spray time may be controlled such that the surface layer of the stamp material is heated to a temperature of 80° C. to 90° C. A planar plate at a normal temperature is used to press the surface layer of the stamp material. The compression of the stamp material being compressed by the planar plate may be about 0.05 to 0.5 cm, and the pressing time may be controlled to be within 1 to 5 seconds. Then, the stamp material is cooled and dried to achieve the processed stamp material.

In the infrared heating process, a stamp material is placed on a planar table. An infrared heater is used to heat a surface layer of the stamp material. The power of the infrared heater and heating time may be controlled such that the surface layer of the stamp material is heated to a temperature of 80° C. to 90° C. A planar plate at a normal temperature is used to press the surface layer of the stamp material. The compression of the stamp material being compressed by the planar plate may be about 0.05 to 0.5 cm, and the pressing time may be controlled to be within 1 to 5 seconds. Then, the stamp material is cooled to achieve the processed stamp material.

As described above, the pressing member may be a metal plate, a roller, or a metal screen. The surface layer of the stamp material may be heated by the heat transferred from the pressing member by heat-conduction and heat-radiation, or may alternatively be heated by high temperature vapour or an infrared heater. Since the stamp material at 80° C. to 90° C. is in a soften state but remains unmolten, by the coaction of the pressure and heat, the micropores in the surface layer of the stamp material are deformed to decrease the size of the micropores, which results in the density of the surface of the stamp material being increased. The increased density of the surface material allows for clearer seals to be formed, while maintaining the high ink injection speed because the density of the material under the surface is not changed. The compressed stamp material may have an about 0.1 to 5 mm reduction in thickness.

The method of the embodiments may have the following independent advantages. Due to the use of simple processing method, only very simple processing tools are required to form a high density layer, which serves as an engraving print surface of a stamp, on a surface layer of a sheet of stamp material. Because a high density printing surface can achieve clearer seals, the present invention can achieve stamp materials having an excellent seal-making result through a simple processing method. Moreover, with the present method, the surface layer of the stamp material can be formed with a regularly accidented surface having bumps and recesses. In use, ink is seeped out from print surface at the bumps while no ink or less ink is seeped out from the print surface at the recesses, thereby better controlling the amount of the ink seepage. As such, the ink soakage into the paper can be greatly diminished, and clearer seals can be formed as a result.

DETAILED DESCRIPTION OF THE INVENTION

Embodiments of the present invention generally employ a pressing member to press a stamp material. The pressing member or a surface layer of the stamp material may be heated to a temperature within 70° C. to 100° C., and preferably, within 80° C. to 90° C. The temperature of the pressing member may also be approximately 100° C. to ensure that the surface of the stamp material can reach a temperature of 80° C. to 90° C. by heat conduction and radiation. The selected stamp material may be a dry and porous stamp material. The pressing member may be a metal plate, a roller, or a metal screen. The surface of the stamp material may be heated by the heat transferred from the pressing member by heat-conduction and heat-radiation, or may alternatively be heated by high temperature vapour or an infrared heater. The stamp material at 80° C. to 90° C. is in a soften state but remains unmolten, and the operating temperature of the present invention may vary with the plastic temperature of different porous stamp materials. By the coaction of the pressure and heat, the micropores in the surface of the stamp material are deformed to decrease the size of the micropores, which results in the density of the surface of the stamp material being increased. The increased density of the surface material allows for clearer seals to be formed, while maintaining the high ink injection speed because the density of the material under the surface layer remains unchanged.

First Embodiment

Figure 1:
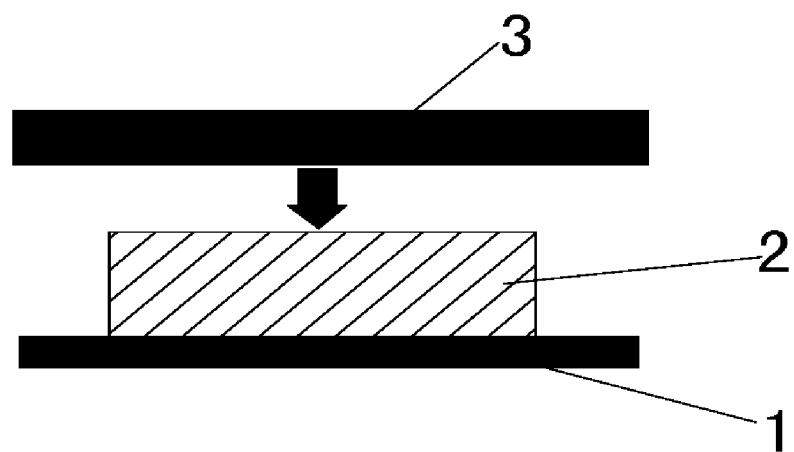
FIG. 1 illustrates a pressing process according to a first embodiment of the present invention in which reference numeral 1 denotes a planar table, reference numeral 2 denotes a stamp material, reference numeral 3 denotes a heated planar metal plate, and the arrow denotes a downward pressing direction of the planar metal plate.

Referring to FIG. 1, a pressing process is illustrated in carrying out the present method for processing a stamp material. A stamp material 2 is placed on a planar table 1. A planar metal plate 3 having a temperature of 80° C. to 90° C. is used to press a surface layer of the stamp material 2. In particular, the compression of the stamp material 2 being compressed by the metal plate 3 is about 0.05 to 0.5 cm, and the pressing time is controlled to be within 1 to 5 seconds. The heat of the metal plate 3 is transferred to the surface layer of the stamp material 2 by heat-conduction and heat-radiation, causing the surface layer of the stamp material 2 to reach a temperature of 80° C. to 90° C. At the temperature of 80° C. to 90° C., the surface layer of the stamp material 2 is in a soften state but remains unmolten. By the coaction of the heat and pressure, the surface layer of the stamp material 2 is compressed such that the micropores in the surface layer of the stamp material 2 are deformed to decrease the size of the micropores, which, accordingly, results in the density of the surface layer of the stamp material being increased. Thereafter, the metal plate 3 is removed, and the stamp material is cooled to a normal temperature. The cooled stamp material may have a 0.1 to 5 mm reduction in thickness. Preferably, in this illustrated embodiment, the stamp material has a 0.2 mm reduction in thickness. The surface layer with increased density serves as the print surface, which allows for clearer seals to be formed.

Second Embodiment

Figure 2:
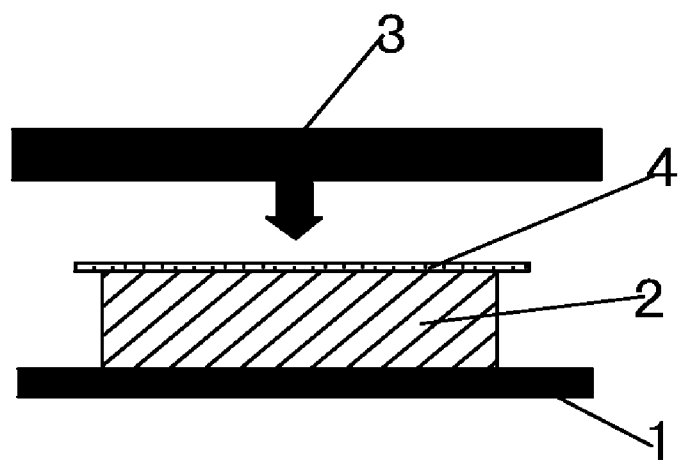
FIG. 2 illustrates a pressing process in conjunction with a screen according to a second embodiment of the present invention in which reference numeral 1 denotes a planar table, reference numeral 2 denotes a stamp material, reference numeral 3 denotes a heated planar metal plate, reference numeral 4 denotes a metal screen, and the arrow denotes a downward pressing direction of the planar metal plate.

Referring to FIG. 2, a pressing process in conjunction with a screen is illustrated in carrying out the present method for processing a stamp material. A stamp material 2 is placed on a planar table 1. A screen 4 is placed over the stamp material 2. The screen 4 is of 200 to 600-mesh, and preferably, in this illustrated embodiment, of 400-mesh. A planar metal plate 3 having a temperature of 80° C. to 90° C. is used to press the screen and a surface layer of the stamp material 2. In particular, the compression of the stamp material 2 being compressed by the metal plate 3 is about 0.05 to 0.5 cm, and the pressing time is controlled to be within 1 to 5 seconds. The heat of the metal plate 3 is transferred to the surface layer of the stamp material 2 by heat-conduction and heat-radiation, causing the surface layer of the stamp material 2 to reach a temperature of 80° C. to 90° C. At the temperature of 80° C. to 90° C., the surface layer of the stamp material 2 is in a soften state but remains unmolten. By the coaction of the heat and pressure, the surface layer of the stamp material 2 is compressed such that the micropores in the surface layer of the stamp material 2 are deformed to decrease the size of the micropores, which, accordingly, results in the density of the surface layer of the stamp material being increased. Thereafter, the metal plate 3 and the screen 4 are removed, and the stamp material is cooled to a normal temperature. The cooled stamp material may have a 0.1 to 5 mm reduction in thickness. Preferably, in this illustrated embodiment, the stamp material has a 0.2 mm reduction in thickness. The surface layer with increased density serves as the print surface, which allows for clearer seals to be formed. In use of stamps, if too much ink is seeped over the print surface, the ink may soak into the paper at edges of the stamp and blur the seal formed on the paper. In this illustrated embodiment, with the use of the 400-mesh screen and by the coaction of the heat and pressure, the surface layer of the stamp material is formed with a regularly accidented surface having bumps and recesses. In use, ink is seeped out from print surface at the bumps while no ink or less ink is seeped out from the print surface at the recesses, thereby controlling the amount of the ink seepage. As such, the ink soakage into the paper can be diminished, and clearer seals can be formed as a result.

Third Embodiment

Figure 3:
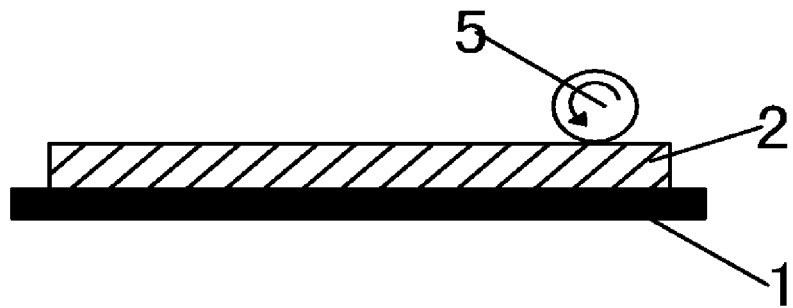
FIG. 3 illustrates a pressing process according to a third embodiment of the present invention in which reference numeral 1 denotes a planar table, reference numeral 2 denotes a stamp material, reference numeral 5 denotes a roller, and the arrow denotes a rolling direction of the roller 5.

Referring to FIG. 3, a rolling process is illustrated in carrying out the present method for processing a stamp material. A stamp material 2 is placed on a planar table 1. A roller 5 having a temperature of 80° C. to 90° C. is used to roll a surface layer of the stamp material 2. In particular, the compression of the stamp material 2 being compressed by the roller 5 is about 0.05 to 0.5 cm, and the rolling speed is controlled to be 5 cm/second. The heat of the roller 5 is transferred to the surface layer of the stamp material 2 by heat-conduction and heat-radiation, causing the surface layer of the stamp material 2 to reach a temperature of 80° C. to 90° C. At the temperature of 80° C. to 90° C., the surface layer of the stamp material 2 is in a soften state but remains unmolten. Under the coaction of the heat and pressure, the surface layer of the stamp material 2 is compressed such that the micropores in the surface layer of the stamp material 2 are deformed to decrease the size of the micropores, which, accordingly, results in the density of the surface layer of the stamp material being increased. Thereafter, the roller 5 is removed, and the stamp material is cooled to a normal temperature. The cooled stamp material may have a 0.1 to 5 mm reduction in thickness. Preferably, in this illustrated embodiment, the stamp material has a 0.2 mm reduction in thickness. The surface layer with increased density serves as the print surface, which allows for clearer seals to be formed.

Fourth Embodiment

Figure 4:
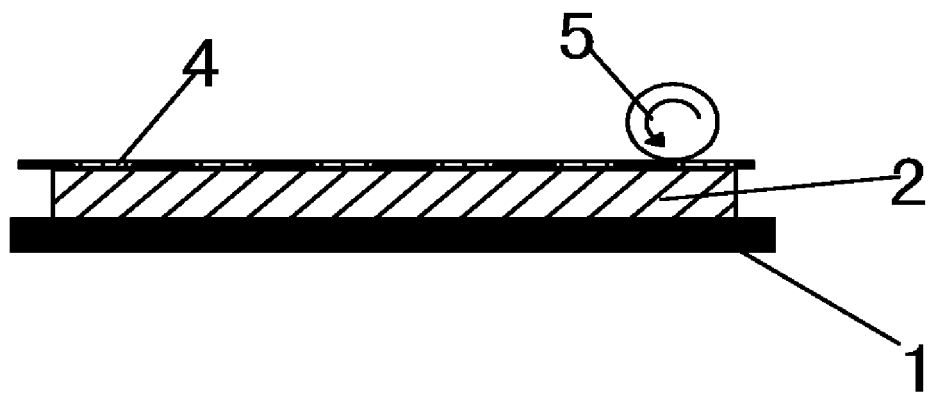
FIG. 4 illustrates a rolling process in conjunction with a screen according to a fourth embodiment of the present invention in which reference numeral 1 denotes a planar table, reference numeral 2 denotes a stamp material, reference numeral 4 denotes a metal screen, reference numeral 5 denotes a roller, and the arrow denotes a rolling direction of the roller 5.

Referring to FIG. 4, a rolling process in conjunction with a screen is illustrated in carrying out the present method for processing a stamp material. A stamp material 2 is placed on a planar table 1. A screen 4 is placed over the stamp material 2. The screen 4 is of 200 to 600-mesh, and preferably, in this illustrated embodiment, of 400-mesh. A roller 5 having a temperature of 80° C. to 90° C. is used to roll a surface layer of the stamp material 2. In particular, the compression of the stamp material 2 being compressed by the roller 5 is about 0.05 to 0.5 cm, and the rolling speed is controlled to be 5 cm/second. The heat of the roller 5 is transferred to the surface layer of the stamp material 2 by heat-conduction and heat-radiation, causing the surface layer of the stamp material 2 to reach a temperature of 80° C. to 90° C. At the temperature of 80° C. to 90° C., the surface layer of the stamp material 2 is in a soften state but remains unmolten. By the coaction of the heat and pressure, the surface layer of the stamp material 2 is compressed such that the micropores in the surface layer of the stamp material 2 are deformed to decrease the size of the micropores, which, accordingly, results in the density of the surface layer of the stamp material being increased. Thereafter, the roller 5 and the screen 4 are removed, and the stamp material is cooled to a normal temperature. The surface layer with increased density serves as the print surface, which allows for clearer seals to be formed. In use of stamps, if too much ink is seeped over the print surface, the ink may soak into the paper at edges of the seal characters and blur the seal formed on the paper. In this illustrated embodiment, with the use of the 400-mesh screen and by the coaction of the heat and pressure, the surface layer of the stamp material is formed with a regularly accidented surface having bumps and recesses. In use, ink is seeped out from print surface at the bumps while no ink or less ink is seeped out from the print surface at the recesses, thereby controlling the amount of the ink seepage. As such, the ink soakage into the paper can be greatly diminished, and clearer seals can be formed as a result.

Fifth Embodiment

In this embodiment, a high temperature vapour heating process is used in carrying out the present method for processing a stamp material. A stamp material is placed on a planar table. A surface layer of the stamp material is heated by spraying a high temperature vapour onto the surface layer. The vapour spray amount and spray time are controlled such that the surface layer of the stamp material is heated to a temperature of 80° C. to 90° C. A planar plate at a normal temperature is used to press the surface layer of the stamp material. In particular, the compression of the stamp material being compressed by the planar plate is about 0.05 to 0.5 cm, and the pressing time is controlled to be within 1 to 5 seconds. At the temperature of 80° C. to 90° C., the surface layer of the stamp material is in a soften state but remains unmolten. By the coaction of the heat and pressure, the surface layer of the stamp material is compressed such that the micropores in the surface layer of the stamp material are deformed to decrease the size of the micropores, which, accordingly, results in the density of the surface layer of the stamp material being increased. Thereafter, the planar plate is removed, and the stamp material is cooled and dried. The cooled stamp material may have a 0.1 to 5 mm reduction in thickness. Preferably, in this illustrated embodiment, the stamp material has a 0.2 mm reduction in thickness. The surface layer with increased density serves as the print surface, which allows for clearer seals to be formed.

Sixth Embodiment

In this embodiment, an infrared heating process is used in carrying out the present method for processing a stamp material. A stamp material is placed on a planar table. An infrared heater is used to heat a surface layer of the stamp material. The power of the infrared heater and heating time are controlled such that the surface layer of the stamp material is heated to a temperature of 80° C. to 90° C. A planar plate at a normal temperature is used to press the surface layer of the stamp material. In particular, the compression of the stamp material being compressed by the planar plate is about 0.05 to 0.5 cm, and the pressing time is controlled to be within 1 to 5 seconds. At the temperature of 80° C. to 90° C., the surface layer of the stamp material is in a soften state but remains unmolten. By the coaction of the heat and pressure, the surface layer of the stamp material is compressed such that the micropores in the surface layer of the stamp material are deformed to decrease the size of the micropores, which, accordingly, results in the density of the surface layer of the stamp material being increased. Thereafter, the planar plate is removed, and the stamp material is cooled and dried, and the cooled stamp material may have a 0.1 to 5 mm reduction in thickness. Preferably, the stamp material has a 0.2 mm reduction in thickness. The surface layer with increased density serves as the print surface, which allows for clearer seals to be formed.

It is to be understood that the embodiments illustrated above are only preferable embodiments in carrying out the present method. In practicing the present method, the pressing member for pressing the stamp material may be a planar plate with a screen mounted thereon, or alternatively may be a planar metal plate having an accidented pressing surface (e.g., grit surface) as fine as the screen. Likewise, the roller for pressing the stamp material may be wrapped with a layer of metal screen. Alternatively, the surface of the roller for pressing the stamp material may be formed with an accidented surface (e.g., grit surface) as fine as the screen. All of the above variations should be considered to be within the scope of the present invention. Therefore, in summary, the present invention provides a simple hot-pressing method which can change the structure of a print surface of a stamp material such that the density of the print surface is increased or the print surface is made to be accidented. By the present method, the ink injection amount over the print surface can be better controlled, such that ink soakage can be greatly diminished, and clearer seals can be formed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing a stamp material having a surface layer, comprising:

heating at least one of a pressing member and the surface layer to a predetermined temperature, wherein the predetermined temperature is higher than an ambient temperature;

using the pressing member to press the surface layer of the stamp material to increase a density of the surface layer; and cooling the stamp material with the surface layer having the increased density down to the ambient temperature, wherein the pressing member comprises a roller, and the acts of heating and pressing comprises:

placing a 200 to 600-mesh screen over the stamp material, and pressing the screen and the surface layer of the stamp material using the roller having a temperature of 80° C. to 90° C.

2. The method in accordance with claim 1, wherein the pressing member comprises a roller, and the acts of heating and pressing comprises pressing the surface layer of the stamp material using the roller having a temperature of 80° C. to 90° C.

3. The method in accordance with claim 1, wherein the act of heating comprises heating the one of a pressing member and a surface layer of the stamp material to a temperature within 70° C. to 100° C.

4. The method in accordance with claim 1, wherein the time for pressing the surface layer of the stamp material is within 1 to 5 seconds.

5. The method in accordance with claim 1, wherein the pressing member comprises a roller, and the act of pressing comprises pressing the surface layer of the stamp material using the roller having a rolling speed of substantially 5 cm/second.

6. The method in accordance with claim 1, wherein the surface layer of the stamp material is pressed such that the compression of the stamp material is substantially 0.05 to 0.5 cm.

7. The method in accordance with claim 1, wherein the stamp material after being cooled has a substantially 0.1 to 5 mm reduction in thickness in comparison with the stamp material prior to the pressing.

8. The method in accordance with claim 7, wherein the reduction in thickness is substantially 0.2 mm.

9. A method for processing a stamp material having a surface layer, comprising:

heating at least one of a pressing member and the surface layer to a predetermined temperature, wherein the predetermined temperature is higher than an ambient temperature;

using the pressing member to press the surface layer of the stamp material to increase a density of the surface layer; and cooling the stamp material with the surface layer having the increased density down to the ambient temperature, wherein the pressing member comprises a roller with a 400-mesh screen wrapped therearound, and the acts of heating and pressing comprises:

pressing the surface layer of the stamp material using the roller having a temperature of 80° C. to 90° C.

\* \* \* \* \*